United States Patent
Osann, Jr.

(10) Patent No.: US 7,341,224 B1
(45) Date of Patent: Mar. 11, 2008

(54) MINIATURE EXPENDABLE SURVEILLANCE BALLOON SYSTEM

(76) Inventor: Robert Osann, Jr., 10494 Ann Arbor Ave., Cupertino, CA (US) 95014

( * ) Notice: Subject to any disclaimer, the term of this patent is extended or adjusted under 35 U.S.C. 154(b) by 79 days.

(21) Appl. No.: 11/251,511

(22) Filed: Oct. 14, 2005

Related U.S. Application Data

(60) Provisional application No. 60/618,750, filed on Oct. 14, 2004.

(51) Int. Cl.
*B64B 1/40* (2006.01)
(52) U.S. Cl. .............................. 244/30; 244/31; 244/61
(58) Field of Classification Search ............ 244/29–31, 244/33, 61
See application file for complete search history.

(56) References Cited

U.S. PATENT DOCUMENTS

| | | | | |
|---|---|---|---|---|
| 2,931,597 | A * | 4/1960 | Moore, Jr. ..................... | 244/97 |
| 2,967,677 | A * | 1/1961 | Winzen et al. .................. | 244/2 |
| 3,077,779 | A * | 2/1963 | Froehlich et al. ......... | 73/864.91 |
| 4,048,565 | A * | 9/1977 | Rice, Sr. ...................... | 455/96 |
| 4,457,477 | A * | 7/1984 | Regipa ......................... | 244/97 |
| 4,799,914 | A * | 1/1989 | Hutchinson .................. | 446/225 |
| 4,931,028 | A * | 6/1990 | Jaeger et al. ................ | 446/225 |
| 5,020,411 | A * | 6/1991 | Rowan ......................... | 89/1.11 |
| 5,652,489 | A * | 7/1997 | Kawakami ................... | 318/587 |
| 5,819,008 | A * | 10/1998 | Asama et al. ............... | 700/255 |
| 6,010,093 | A * | 1/2000 | Paulson ........................ | 244/24 |
| 6,084,510 | A * | 7/2000 | Lemelson et al. ..... | 340/539.13 |
| 6,119,983 | A * | 9/2000 | Provitola .................. | 244/171.3 |
| 6,182,924 | B1 * | 2/2001 | Nott .............................. | 244/95 |
| 6,317,080 | B1 * | 11/2001 | Baxter, Jr. ............. | 342/357.09 |
| 6,374,155 | B1 * | 4/2002 | Wallach et al. ............. | 700/245 |
| 6,429,812 | B1 * | 8/2002 | Hoffberg .................. | 342/357.1 |
| 6,565,037 | B1 * | 5/2003 | Tonkovich ...................... | 244/5 |
| 6,715,712 | B2 * | 4/2004 | Boschma, Jr. ............... | 244/30 |
| 6,778,211 | B1 * | 8/2004 | Zimmermann et al. .. | 348/218.1 |
| 6,795,113 | B1 * | 9/2004 | Jackson et al. .......... | 348/207.1 |
| 6,837,458 | B2 * | 1/2005 | Swearingen et al. .......... | 244/30 |
| 6,883,749 | B2 * | 4/2005 | Boschma, Jr. ............... | 244/30 |
| 6,896,222 | B2 * | 5/2005 | Dossas et al. ................. | 244/24 |
| 6,904,335 | B2 * | 6/2005 | Solomon ..................... | 700/247 |
| 7,055,777 | B2 * | 6/2006 | Colting ........................ | 244/30 |
| 7,173,649 | B1 * | 2/2007 | Shannon ..................... | 348/144 |
| 2002/0013641 | A1 * | 1/2002 | Nourbakhsh et al. ....... | 700/245 |
| 2004/0245385 | A1 * | 12/2004 | McElroy et al. ............. | 244/58 |

OTHER PUBLICATIONS

"Micro Fuel Cells—Technical Info." Gangi, Jennifer, updated Dec. 2003, Fuel Cells 2000 Available at http://fuelcells.org/info/charts/MicroTechnical.pdf.*

* cited by examiner

Primary Examiner—Teri Pham Luu
Assistant Examiner—Joseph W Sanderson

(57) ABSTRACT

A miniature surveillance balloon system is described that can be used in military and public safety situations for real-time observations. They are as small as feasibly possible, low-cost and expendable, and typically are deployed in clusters. Balloons may act individually or alternately clusters may act robotically (in unison) without command input at times. Video surveillance information is preprocessed and then sent via wireless communications links. Batteries and/or gas cylinders may be selectively jettisoned to facilitate vertical movement. Balloons may optionally have thruster mechanisms to facilitate lateral movement which may in some embodiments be powered by a source of combustible gas which is also used for providing lift.

13 Claims, 4 Drawing Sheets

MINIATURE EXPENDABLE SURVEILLANCE BALLOON SYSTEM

CROSS REFERENCE TO RELATED APPLICATIONS AND DISCLOSURES

This application claims the benefit and priority of U.S. Provisional Application Ser. No. 60/618,750, filed on Oct. 14, 2004, and entitled "Miniature expendable surveillance balloon system," commonly assigned with the present invention and incorporated herein by reference.

FIELD OF THE INVENTION

This invention relates to the field of surveillance devices used in warfare and hostile public safety situations. In particular, the invention relates to miniature robotic devices for observing the situation and behavior of potentially hostile positions.

BACKGROUND

In modern counter-insurgency warfare, as well as domestic urban assaults, there is no substitute for knowing the quantity and exact location of enemy combatants. Satellite surveillance is certainly useful, but can be obscured by cloud cover. Unmanned aerial surveillance vehicles are also useful, but are either at elevations too high to provide the desired viewing angle or when making low passes, are only in a particular location for a brief amount of time.

Having better knowledge of enemy positions, especially in house-to-house fighting, is not only advantageous in preserving the lives of friendly combatants by pinpointing the enemy's location, strength, and weaponry. By careful targeting guided by improved surveillance, lives of innocent civilians will also be saved that would otherwise have been lost.

Soldiers have always suffered from lack of knowledge regarding what is "just around the corner". The concept of deploying a cluster of miniature surveillance balloons addresses this problem. These devices would observe activity and relay video or still image information from one to the next, the information eventually arriving at the soldiers who require the information and/or Command & Control.

These miniature surveillance balloons are essentially robots—capable of operating on their own when necessary. They also are able to operate in an intelligent cluster where together they can accomplish a goal by coordinating their efforts. Thus they become a socially interactive multiple robot system. Methods for controlling and manipulating a cluster of such robots have been described in a number of prior art references.

What is currently lacking, besides miniaturization, is the ability of a robot surveillance balloon to control its position in order to coordinate with other such balloons to effectively cover the deployment such that the desired surveillance objective is properly viewed. To do this, a balloon should have the ability to control its motion in both vertical and lateral directions.

SUMMARY

A miniature surveillance balloon system is described that can be used in military and public safety situations for real-time observations. They are low-cost and expendable, and typically are deployed in clusters. Balloons may act individually or alternately clusters may act robotically (in unison) without command input at times. Balloon systems may be deployed by dropping from aircraft or by some form of artillery or rocket launch mechanism.

In some optional embodiments, balloons may have thruster mechanisms to facilitate lateral movement. Balloons may also be used individually or in clusters as a weapons system.

Size

The balloon system should be as small and light as possible, while still performing its required mission.

Gas Sack and Gas

The balloon gas sack may be rigid or inflatable. If inflatable, it may be inflated before deployment or may inflate at the time of deployment from gas stored in a small cylinder. If a cylinder is used, the cylinder may have the ability to be jettisoned in order to reduce the overall weight of the balloon system. The gas used may be helium or hydrogen or other "lighter-than-air" gas. If hydrogen, there may be included the ability to selectively oxidize some of the Hydrogen gas in a controlled manner to produce thrust and/or produce electricity (as in a fuel cell).

Electrical Power

The balloon's electronics systems may be powered by battery, solar power, and/or hydrogen power (fuel cell). The outer surface of the balloon's gas sack may implement a solar cell or have multiple solar cells deployed upon it. Batteries may be re-chargeable from the solar cells, or by energy conversion from hydrogen gas.

Batteries

The system may be designed such that the batteries are implemented as a group of individual batteries where the physical mounting and electrical connection means is such that individual batteries may be jettisoned in order to make the balloon system lighter. Batteries may be re-chargeable or not.

Electromechanical Controls

These may be implemented using miniature conventional solenoid mechanisms, or alternately by micro-machines implemented in advanced semiconductor technology, or some combination of the two.

Directional Travel and Thrusters

In general, the balloon system may be encouraged to travel in the vertical direction by releasing gas from the bag to descend and by either injecting gas from the compressed gas cylinder and/or jettisoning weight to ascend. The balloon system may optionally include some form of directional thrusters to allow it to travel in a specific horizontal direction and/or travel in a vertical direction at a rate faster than the effects of lift and weight would allow. Thrusters may be provided by solid rocket propellant, or alternately by miniature engines that burn hydrogen gas from the bag or from the gas cylinder.

Vision System

The system will include at least one image sensor providing at least a static image and more desirably, a video image. This system will provide a 360 degree view. The 360 degree view can be accomplished by having multiple image sensors or by having a single image sensor array combined with a lens that enables a 360 degree capture (see IPIX method). If there are multiple sensor arrays, there may be for instance 3 image sensor arrays, each covering a 120 degree view. If video capability is included, the frame rate may be variable such that the capacity of the available communications link is not overloaded. Video compression is typically performed and image preprocessing may also be performed to eliminate unwanted information and further lessen the bandwidth requirement that is placed on the communications system. The vision system may include IR capability for night viewing.

Communications

Communications to and from Command and Control are by a wireless link, the form of which could be point-to-multipoint, wireless mesh, or a combination to the two. Each balloon system has at least one radio for this purpose. The antenna may be implemented as wires that are attached to the gas bag, or alternately trail below the balloon assembly.

GPS

The system should include an internal GPS sensor to enable it to report back its position.

Altimeter

The system should have an altitude sensor to enable it to know its altitude in order to seek a desired altitude.

Explosive Capability

Although small, the unit may optionally carry a small amount of explosive to be used as a weapon if necessary. Also, if hydrogen gas is used in the gas bag, this may optionally serve as an explosive. If the capture of a balloon according to this invention is a concern, the gas in the bag may also be exploded as a form of self-destruct mechanism.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
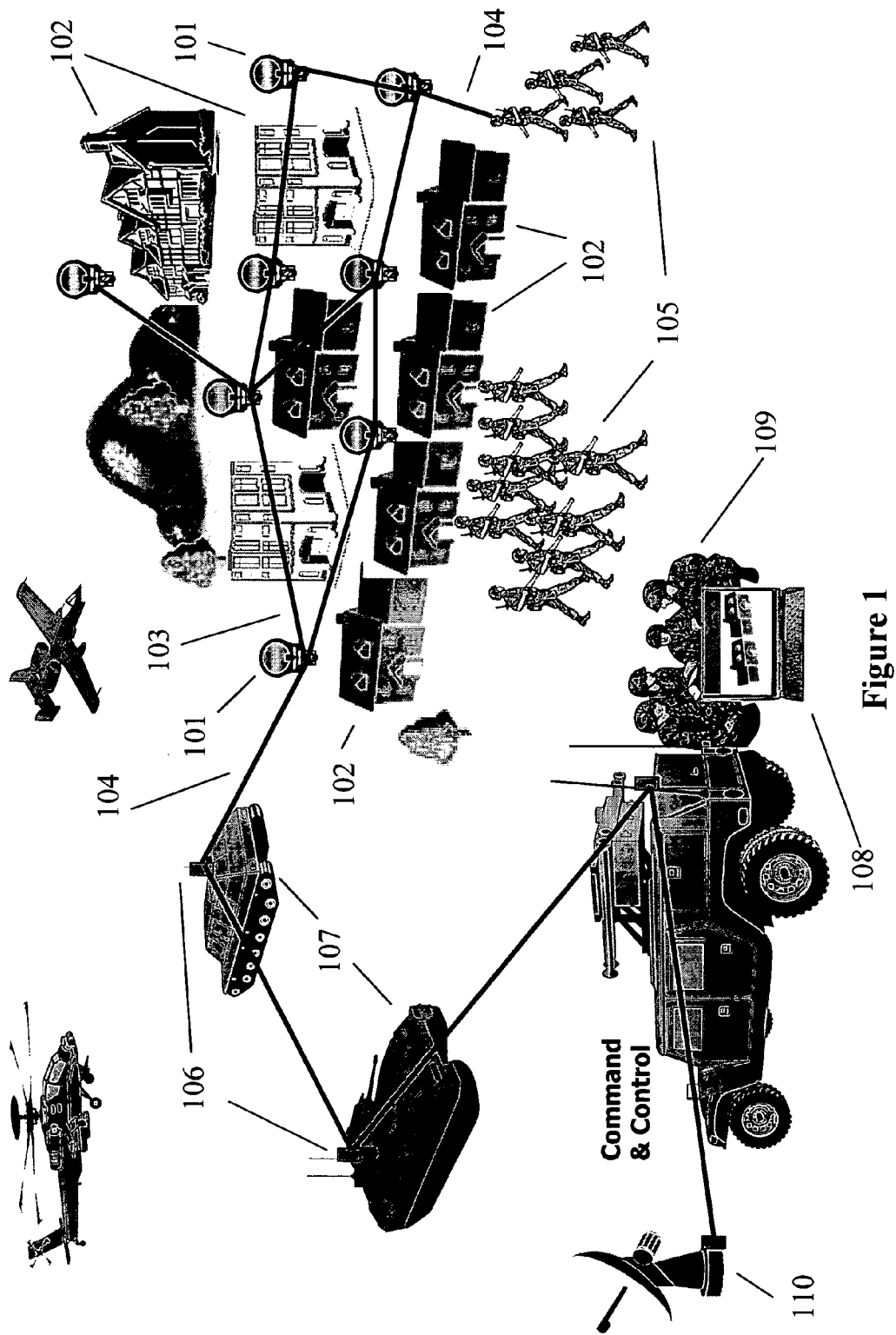
FIG. 1 shows a battlefield scene where a cluster of miniature balloons according to this invention have been deployed among a group of buildings where hostile activity is suspected.

FIG. 1 shows a battlefield scene where a cluster of miniature balloons according to this invention have been deployed among a group of buildings where hostile activity is suspected. Such a scene could just as easily take place in a civil environment where SWAT teams are attacking positions held by criminals or terrorists. To aid the soldiers or SWAT personnel in understanding the strength and locations of their opponents, a cluster of balloons 101 according to this invention are launched or dropped over the scene. They are preprogrammed to deploy at a given altitude above ground level. Each contains an altimeter and since each also has a GPS sensor, the altitude for "ground level" can always be determined from the GPS coordinates.

Balloons are deployed such that they are interspersed among houses and buildings 102 where observation is desired. Balloons communicate with one another by wireless communications link 103. They also communicate via wireless communications link 104 with personnel 105 as well as relay nodes 106 which may be mounted on vehicles 107.

Surveillance information 108 may be observed locally by personnel 105 and local command personnel 109, and may also be observed at a remote Command and Control center via a link such as satellite link 110.

Figure 2:
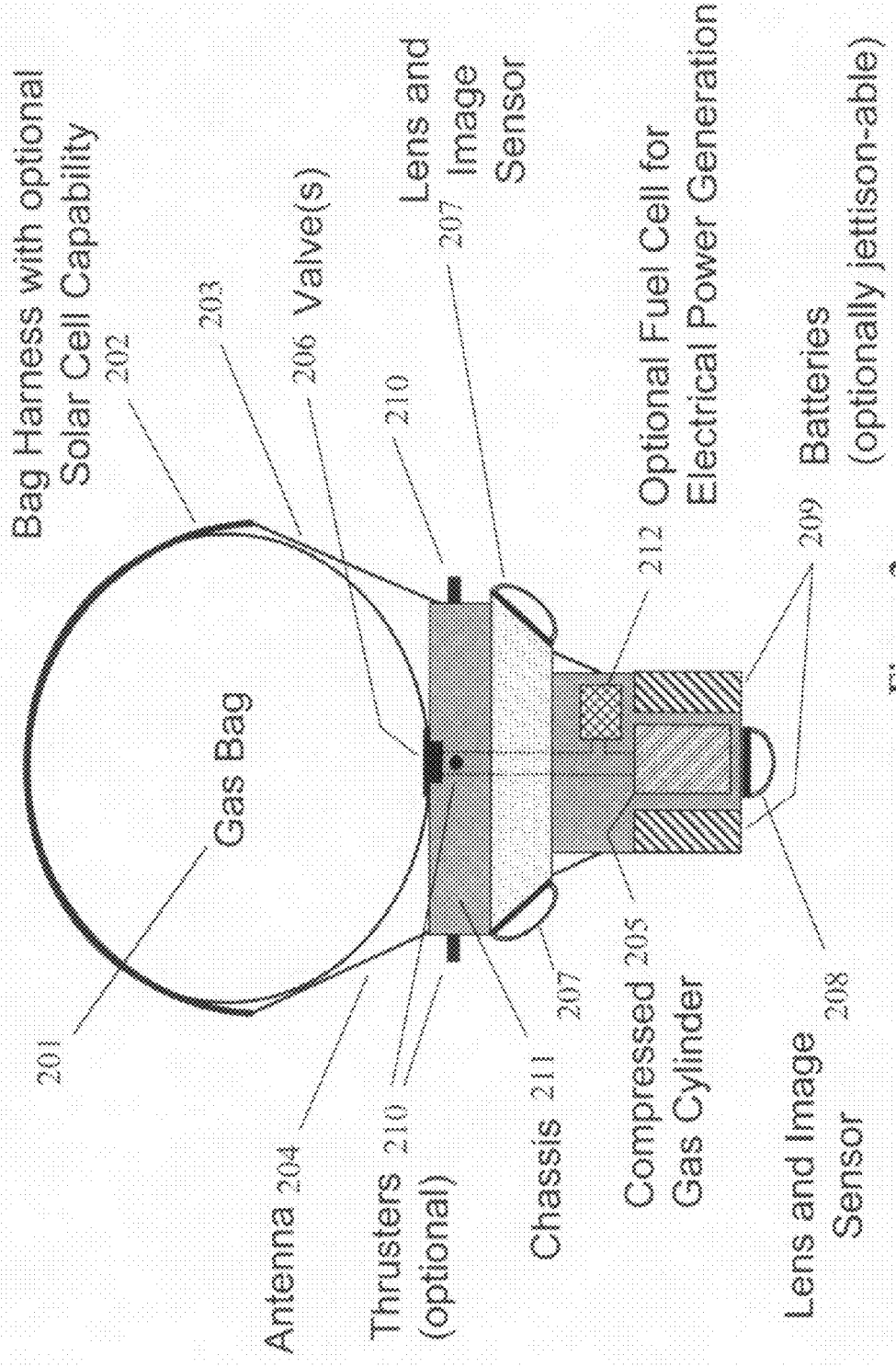
FIG. 2 shows the primary components of a surveillance balloon according to this invention.

FIG. 2 shows a cross-sectional view of the major components of a miniature expendable surveillance balloon according to this invention. The size should be as small as possible, hence the name "miniature". Ideally, the vertical height of a balloon should be only a few inches, for at this size level they would typically be invisible to the human eye and most deployment distances. A hummingbird at an elevation of 100 ft is barely visible to the human eye, and were it not for the unique sounds they emit when flying that high, one would never notice them at that height. Thus the length of a hummingbird, around 3 inches, should be the goal for the maximum dimension of the subject miniature surveillance balloon system. Given that miniaturization techniques may not allow such small dimensions today, the goal for size should be to achieve a size where it will be difficult to destroy or damage the balloon with small arms fire.

To make the balloon expendable mostly requires a low cost. Economies of scale will provide this if balloons are manufactured in large enough numbers. Another goal of expendability is that it is acceptable for the balloon to fall into the hands of the enemy. Thus, the electronics should be designed such that the software and firmware has some form of intentional volatility. One way to do this is for the software to be initially stored in non-volatile memory such as flash memory, and then transferred to volatile RAM at the initial phase of the turn-on sequence. Then, the non-volatile memory can be erased and if captured, the device can automatically shut off power to the volatile memory thereby destroying the software. The event of the balloon being captured can be marked either by certain attitude changes or by tampering, or by movement to a GPS position outside the deployment area. Also, if the balloon simply expires with its power reserve expended, the software will likewise expire.

At the center of the balloon assembly as shown in FIG. 2 is gas bag 201 which may be rigid or alternately inflate from an initially collapsed condition. This can be pre-inflated prior to deployment or more likely, inflated from lightweight compressed gas container 205 which is most probably implemented as a cylinder that is placed integral to the balloon assembly. The gas bag may simply be attached directly to chassis 211 or may be covered with a bag harness 202 which may have optional solar cell capability. If a harness is utilized, it can be attached to chassis 211 by way of ties 203 which can also include electrical conductors for carrying electricity from the solar cell to the electronic processor subsystem contained in the chassis. Another form of tie 204 to constrain the gas bag can perform an antenna function while also attaching harness 202 to chassis 211. Alternately, the antenna can be deployed by extending vertically downward from the chassis.

Electrical power for the processor subsystem contained in the chassis that controls all the functions of the balloon subsystem may therefore come from a variety of sources. It may come from batteries which may be recharged from solar cells on the bag harness. Power may also come from a miniature fuel cell 212 that converts energy by oxidizing Hydrogen gas stored in gas cylinder 205.

Gas cylinder 205 contains a lighter-than-air gas such as Helium or Hydrogen. If the gas bag is not inflated prior to deployment, this valve will open at deployment to allow the bag to inflate. The valve is miniature and is controlled by a miniature electrically-controlled actuation mechanism. The various alternatives for these functions are well known in the art as miniature valves are used in a number of commercial and military applications including medical implants. A promising new technology for this application are microvalves which are manufactured using MEMS technology. Biomedical systems that incorporate MEMS have already been demonstrated including precision drug delivery devices using integrated microvalves and micropumps (see article in the September/October 1999 issue of Medical Equipment Designer magazine, entitled: "MEMS and Micromachining in the New Millennium"). A similar valve may also be included that releases gas from bag 201 to allow the balloon to descend. If the gas bag can be inflated to a desired initial level with a reserve of gas remaining in cylinder 205, then additional gas may be injected into bag 201 at a later point in time by actuating valve 206. As mentioned earlier, the electronics contained within chassis 211 also contain an altimeter sensor as well as a GPS location sensing device. The elevation of the balloon may therefore be adjusted automatically by selectively injecting and releasing gas from the bag under control of the electronics contained in chassis 211 which contains a processor subsystem for controlling all functions of the balloon.

When the gas in the cylinder is exhausted, the only way to lighten the balloon assembly to enable ascent is to jettison weight. Candidates to be jettisoned include spent batteries and/or spent gas cylinders. In either case, miniature electromechanical or MEMS actuators can be used to release a battery of gas cylinder in order to jettison it.

Given this ability of the balloon to programmably ascend and descend, the operational life of the balloon assembly may be extended to several days, since the balloon could descend to ground level at night and then lighten itself to rise again the next morning.

In addition to moving vertically as just described, the balloon may optionally include a lateral thrust capability. This could be in the form of small solid rocket propellants which could be used for lateral motion or even included to accelerate vertical motion. Also, if the chosen gas is Hydrogen, then some of the Hydrogen gas can be used as a rocket propellant to facilitate lateral motion. To enable this function, some of the hydrogen gas from cylinder 205 would be diverted to thrusters 210 where is would be ignited with a miniature igniter such as a miniature piezoelectric igniter which is well known in the art.

The ability of the balloon assembly to observe is facilitated by one or more image sensors 207 which may be mounted in different positions around the assembly, and/or positioned underneath the assembly as shown for sensor 208. An image processing function is included in the electronics contained in chassis 211 to compress and pre-process either still or video images that are acquired from sensors 207 and 208, before these images are transmitted to other balloons or wireless relay nodes. Image sensors may include IR capability for night viewing. One way to reduce the number of sensors required is to use a lens that enables a 360 degree view to be captured in the manner utilized by the IPIX products manufactured by Minds-Eye-View, Inc. of Cohoes, N.Y., and also described in U.S. Pat. No. 6,795,113 to Jackson et al and U.S. Pat. No. 6,778,211 to Zimmerman et al.

Figure 3:
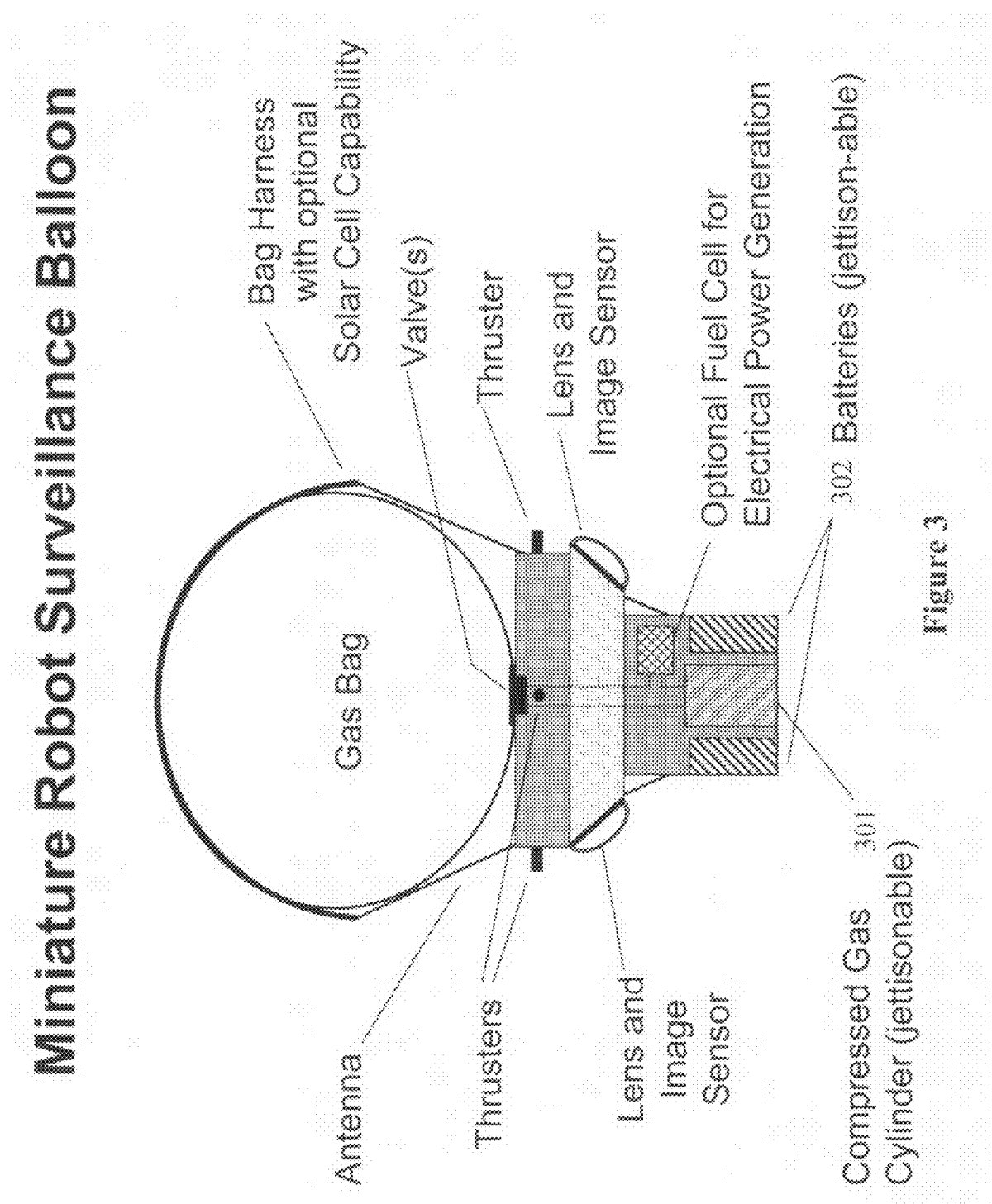
FIG. 3 shows an alternate embodiment of a surveillance balloon according to this invention where the compressed gas cylinder is jettison-able.
Figure 4:
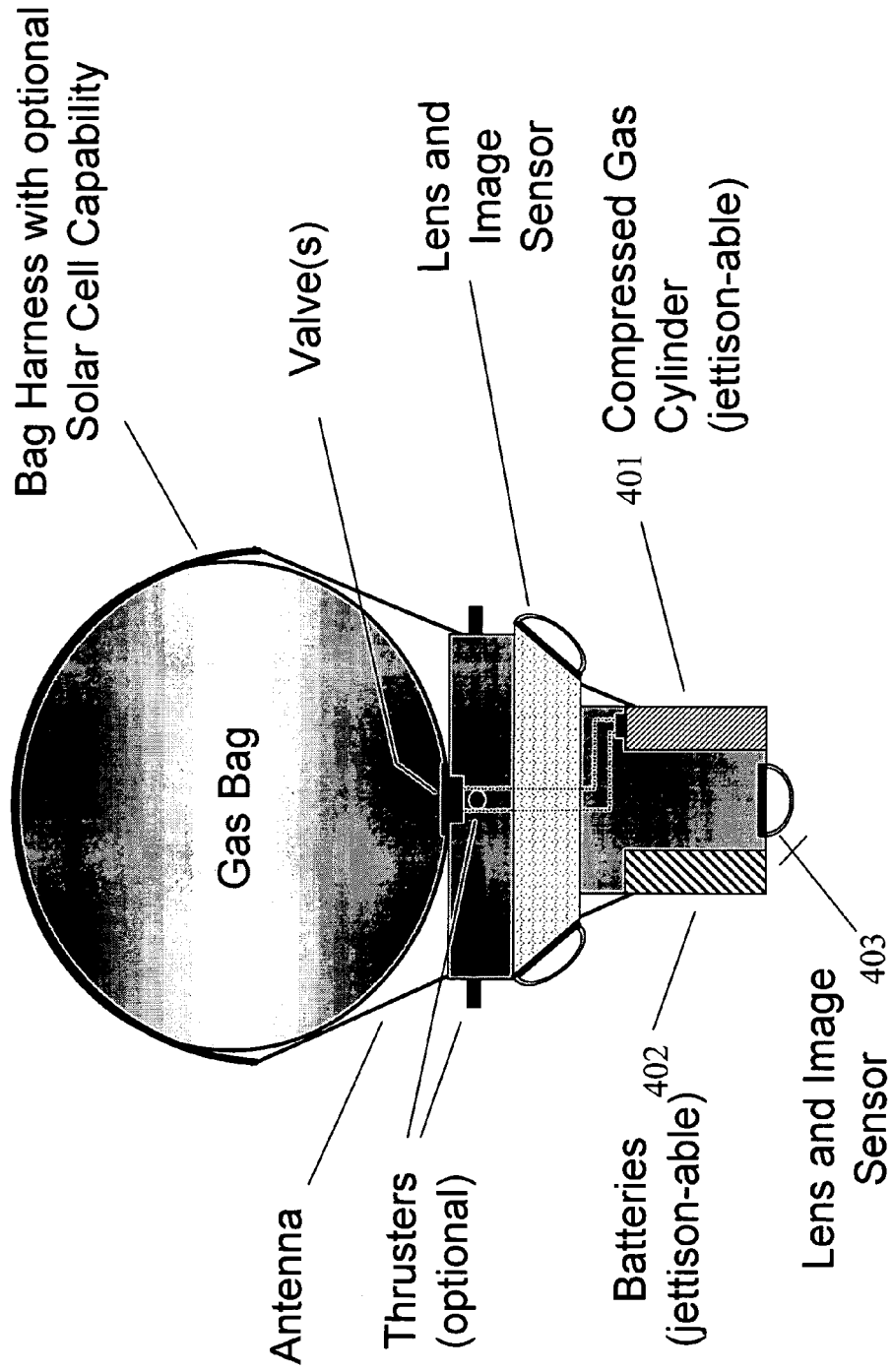
FIG. 4 shows the preferred embodiment of a surveillance balloon according to this invention where both the compressed gas cylinders and batteries are jettison-able, and an image sensor may still be located underneath the assembly if desired.

FIG. 3 shows an alternative assembly configuration where the gas cylinder 301 is jettison-able. With a central placement shown for cylinder 301, and with batteries 302 also jettison-able, it would be difficult to mount an image sensor beneath the assembly as shown for sensor 208 in FIG. 2. Since it may be desirable to have sensor 403 underneath the assembly, the embodiment of FIG. 4 may be preferred which places gas cylinder(s) 401 and batteries 402 at the edge of the chassis enabling image sensor 403 to be mounted underneath the center of the assembly.

Balloons may act individually or alternately clusters may act robotically (in unison) without command input at times. The methods of coordinating the movements of multiple entities in a cluster are well known in the art as exemplified by U.S. Pat. No. 6,904,335 to Solomon referenced earlier in this document.

Therefore, a miniature expendable surveillance balloon has been described.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A miniature surveillance balloon system comprising a gas bag, an amount of lighter-than-air gas sufficient to enable the balloon system to ascend, a valve to deflate the gas bag for descent, a source of electrical power, at least one image sensor, an electronic processor subsystem for control and image processing, a GPS sensor, an altitude sensor, a radio communications system, and also including;
   at least one battery that is jettisoned during flight and under control of the electronic processor subsystem to enable vertical movement of the balloon system.

2. The balloon system according to claim 1 further including lateral thrusters powered by hydrogen gas.

3. The balloon system according to claim 1 further including lateral thrusters powered by solid rocket propellant.

4. The balloon system according to claim 1 further including the capability to jettison at least one compressed gas container during flight and under control of the electronic processor subsystem.

5. The balloon system according to claim 1 wherein electrical power is supplied by a miniature fuel cell operating on hydrogen gas.

6. A miniature surveillance balloon system comprising a gas bag, an amount of lighter-than-air gas sufficient to enable the balloon system to ascend, a valve to deflate the gas bag for descent, a source of electrical power, at least one image sensor, an electronic processor subsystem for control and image processing, a GPS sensor, an altitude sensor, a radio communications system, and also including;
   at least one compressed gas container that is jettisoned during flight to enable vertical movement of the balloon system.

7. The balloon system according to claim 6 further including lateral thrusters powered by hydrogen gas.

8. The balloon system according to claim 6 further including lateral thrusters powered by solid rocket propellant.

9. The balloon system according to claim 6 further including the capability to jettison at least one battery during flight and under control of the electronic processor subsystem.

10. The balloon system according to claim 6 wherein electrical power is supplied by a miniature fuel cell operating on hydrogen gas.

11. A miniature surveillance balloon system comprising a gas bag, an amount of lighter-than-air gas sufficient to enable the balloon system to ascend, a valve to deflate the gas bag for descent, a source of electrical power, at least one image sensor, an electronic processor subsystem for control and image processing, a GPS sensor, an altitude sensor, a radio communications system, and also including;

at least one battery that is jettisoned during flight and under control of the electronic processor subsystem to enable vertical movement of the balloon system, and;

at least one compressed gas container that is jettisoned during flight and under control of the electronic processor subsystem to enable vertical movement of the balloon system.

12. The balloon system according to claim 11 further including lateral thrusters powered by hydrogen gas.

13. The balloon system according to claim 11 further including lateral thrusters powered by solid rocket propellant.

* * * * *